(12) United States Patent
Breu et al.

(10) Patent No.: US 9,073,434 B2
(45) Date of Patent: Jul. 7, 2015

(54) METHOD FOR OPERATING A FORWARD-GUIDING DRIVER ASSIST SYSTEM IN A MOTOR VEHICLE, AND A MOTOR VEHICLE

(75) Inventors: Alexander Breu, Weiding (DE); Manfred Holzmann, Greding (DE)

(73) Assignee: AUDI AG, Ingolstadt (DE)

( * ) Notice: Subject to any disclaimer, the term of this patent is extended or adjusted under 35 U.S.C. 154(b) by 16 days.

(21) Appl. No.: 13/480,067

(22) Filed: May 24, 2012

(65) Prior Publication Data
US 2013/0138312 A1 May 30, 2013

(30) Foreign Application Priority Data

May 25, 2011 (DE) .......................... 10 2011 102 332

(51) Int. Cl.
| | | |
|---|---|---|
| G06F 7/00 | (2006.01) |
| G06F 17/00 | (2006.01) |
| G06F 19/00 | (2011.01) |
| B60K 31/00 | (2006.01) |
| B60W 10/02 | (2006.01) |

(Continued)

(52) U.S. Cl.
CPC ................ B60K 31/00 (2013.01); B60W 10/02 (2013.01); B60W 10/184 (2013.01); B60W 30/143 (2013.01); B60W 30/18072 (2013.01); B60W 2030/1809 (2013.01); B60W 2710/025 (2013.01); F16D 48/06 (2013.01); F16D 2048/0254 (2013.01); F16D 2500/30406 (2013.01); F16D 2500/5043 (2013.01); F16D 2500/508 (2013.01); F16D 2500/5085 (2013.01); B60W 2600/00 (2013.01)

(58) Field of Classification Search
CPC .... B60K 31/00; B60W 10/02; B60W 10/184; B60W 30/143; B60W 30/18072; B60W 2030/1809; B60W 2710/025; B60W 2600/00; F16D 48/06; F16D 2048/0254; F16D 2500/30406; F16D 2500/5043; F16D 2500/508; F16D 2500/5085
USPC .......................................................... 701/67
See application file for complete search history.

(56) References Cited

U.S. PATENT DOCUMENTS

| 5,638,271 A | * | 6/1997 | White et al. ..................... 701/64 |
| 6,050,379 A | * | 4/2000 | Lyon ............................ 192/54.1 |

(Continued)

FOREIGN PATENT DOCUMENTS

| CN | 1860676 | 11/2006 |
| DE | 10 2004 031 833 | 1/2006 |

(Continued)

OTHER PUBLICATIONS

EP 1930614 A2 (Inventor: Sarrazin et al.) Machine Translation from Espacenet website of Description, Abstract.*

*Primary Examiner* — Calvin Cheung
*Assistant Examiner* — Paula L Schneider
(74) *Attorney, Agent, or Firm* — Henry M. Feiereisen LLC

(57) ABSTRACT

A method for operating a forward-guiding driver assist system, in particular an ACC system, in a motor vehicle having a clutch pedal as a driver-operated actuator for manually operating a clutch and an additional clutch actuator includes the steps of performing with the driver assist system at least one driving intervention for controlling the speed of the motor vehicle, determining a desired clutch slip, when controlling the speed, and controlling the additional clutch actuator for automatically disengaging and engaging the clutch commensurate with the determined clutch slip.

7 Claims, 2 Drawing Sheets

(51) Int. Cl.
  *B60W 10/184* (2012.01)
  *B60W 30/14* (2006.01)
  *B60W 30/18* (2012.01)
  *F16D 48/06* (2006.01)
  *F16D 48/02* (2006.01)

(56) References Cited

U.S. PATENT DOCUMENTS

| | | | |
|---|---|---|---|
| 7,197,390 B2 | 3/2007 | Yuan et al. | |
| 2008/0147285 A1* | 6/2008 | Joshi et al. | 701/67 |
| 2009/0305844 A1* | 12/2009 | Klump | 477/71 |
| 2011/0174559 A1* | 7/2011 | Saito et al. | 180/65.27 |

FOREIGN PATENT DOCUMENTS

| | | |
|---|---|---|
| DE | 10 2005 017 025 A1 | 10/2006 |
| DE | 10 2005 050 043 | 5/2007 |
| DE | 10 2006 057 435 A1 | 6/2008 |
| DE | 10 2009 022 287 A1 | 12/2009 |
| EP | 1 930 614 A2 | 6/2008 |
| EP | 2 269 882 A2 | 6/2010 |

* cited by examiner

METHOD FOR OPERATING A FORWARD-GUIDING DRIVER ASSIST SYSTEM IN A MOTOR VEHICLE, AND A MOTOR VEHICLE

CROSS-REFERENCES TO RELATED APPLICATIONS

This application claims the priority of German Patent Application, Serial No. 10 2011 102 332.5, filed May 25, 2011, pursuant to 35 U.S.C. 119(a)-(d), the content of which is incorporated herein by reference in its entirety as if fully set forth herein.

BACKGROUND OF THE INVENTION

The present invention relates to a method for operating a forward-guiding driver assist system, in particular an ACC (automatic cruise control) system, in a motor vehicle, and to a motor vehicle with such forward-guiding driver assist system.

The following discussion of related art is provided to assist the reader in understanding the advantages of the invention, and is not to be construed as an admission that this related art is prior art to this invention.

Forward-guiding driver assist systems in motor vehicles are known in the art. One type of configuration is implemented as a so-called cruise control system, wherein the driver can select a desired speed which the driver assist system then controls by way of braking and acceleration interventions. So-called ACC (adaptive cruise control) systems with two operating modes have been proposed to allow a forward-guiding driver assist system to also be used for distance-controlled driving. In an unrestricted driving mode, the desired speed is controlled in the same way as known from cruise control. However, if a vehicle in front moves slower than the desired speed, the ACC system is operated in a slave mode, whereby a certain distance, mostly a time gap, to the vehicle in front as controlling object is regulated through braking and acceleration interventions. The controlled distance can also be designed so as to allow modifications by the driver.

Such forward-guiding driver assist systems, in particular ACC systems, were also proposed for motor vehicles with a manual transmission. In motor vehicles with a manual transmission, the driver manually operates the clutch of the manual transmission via the clutch pedal operating as an actuator. ACC systems in motor vehicles with manual transmissions presume that a valid forward gear is engaged and the drive train, including the clutch, is fully engaged, representing a coupled mode. Otherwise, the ACC function is deactivated or cannot be activated.

ACC systems, or more generally forward-guiding driver assist systems, frequently also use for controlling the speed of the motor vehicle an overrun cutoff for the engine so as to use the drag torque deceleration (engine brake). As soon as the engine of the motor vehicle transitions into the overrun cutoff, the motor vehicle is decelerated due to the applied drag deceleration, which may be different and quite noticeable depending on the engine variant and the engaged gear.

Conventional forward-guiding driver assist systems, in particular ACC systems used in motor vehicles with manual transmissions exhibit several problems. A first group of problems results because certain required target accelerations or target decelerations are not fully available. This will be described in more detail with reference to an example. In an exemplary motor vehicle, the drag torque deceleration is -0.8 m/s$^2$, when the engine is in overrun cutoff mode. If the motor vehicle were to move freely with the clutch disengaged (coasting mode), the final vehicle acceleration would be 0 m/s$^2$. Vehicle accelerations in a range >-0.2 m/s$^2$ could be adjusted with the torques adjustable in driving mode. However, this means that a relatively large acceleration band exists in the coupled state, which cannot be controlled at all or is difficult to control.

Control of the forward-guiding driver assist systems frequently has the problem that although a slight deceleration or coasting of the motor vehicle should be realized, the overrun cutoff torque of the engine and hence the drag torque deceleration are too large, causing the motor vehicle to slowed down more quickly than actually desired by the forward-guiding driver assist system. As a result, the driver assist system is then forced to transmit a torque demand to the engine to terminate the overrun cutoff, because the speed should be reduced less quickly. Disadvantageously, this approach produces side effects which negatively affect the comfort. Switching into the drive mode is frequently noticeable and results in a "jerky" overall effect. Moreover, engine variants are known where small torque demands cannot be exactly set. The aforementioned "jerk effect" can then be quite pronounced and cause oscillations, because the engines frequently provide excessively high torques, which may then lead to an undesirable undue speed increase, so that the control function of the forward-guiding driver assist systems must then again severely reduce the torque demand or in extreme cases even apply the brake following the torque conversion. This may also cause intermittent operation of the brake light. An exceedingly fast change of the operating mode of the engine into or out of the overrun cutoff also reduces the comfort of the functionality of the forward-guiding driver assist system, because the effects are directly fed back to the motor vehicle via the drive train.

To eliminate these comfort-related problems, it has been proposed to use defined hystereses for controlling the engine and the brake within the control function of the forward-guiding driver assist system, which has the disadvantage that the desired speed cannot be cleanly regulated in these situations, or the desired distance or the controlled distance cannot be exactly maintained.

Disadvantageously, forward-guiding driver assist systems presently employed in motor vehicles with manual transmissions are typically unable to implement measures for optimizing fuel consumption, for example use of a coasting mode and the like. To operate the forward-guiding driver assist system, a valid forward gear stage must be engaged and the drive train must be completely closed, meaning that the clutch must be engaged. This approach prevents a driving strategy of the driver assist system for optimizing fuel consumption, where the vehicle coasts freely with an uncoupled drive train or drives with clutch slip.

It would therefore be desirable and advantageous to obviate prior art shortcomings and to provide an improved forward-guiding driver assist system for use with manual transmissions which improves driving comfort and energy consumption.

SUMMARY OF THE INVENTION

According to one aspect of the present invention, a method for operating a forward-guiding driver assist system, in particular an ACC system, in a motor vehicle having a clutch pedal as a driver-operated actuator for manually operating a clutch and an additional clutch actuator includes the steps of performing with the driver assist system at least one driving intervention for controlling the speed of the motor vehicle, determining a desired clutch slip, when controlling the speed, and controlling the additional clutch actuator for automatically disengaging and engaging the clutch commensurate with the determined clutch slip.

According to another advantageous feature of the present invention, a motor vehicle can be used which includes a basically manually switched transmission with a clutch pedal operating as an actuator for operating the clutch. The clutch pedal is used to disengage and engage the clutch purely mechanically, for example with a Bowden cable. Independently, an additional actuator, namely the clutch actuator, is provided which can automatically disengage and engage the clutch without requiring actuation of the clutch pedal. The clutch actuator may be implemented, for example, as a servo motor and preferably engage directly on the clutch, for example directly on the clutch disk. Both actuators thus operate on the clutch in parallel, so that they are fundamentally independent, at least with respect to disengaging the clutch. The clutch can always be disengaged by the driver with the clutch pedal even when the clutch is engaged with the clutch actuator. The driver thus always maintains control over the clutch, so that the transmission is still a manual transmission which, however, offers additional advantageous possibilities with respect to a forward-guiding driver assist system.

According to another advantageous feature of the present invention, not only a demand for acceleration (which includes as negative acceleration values also a demand for deceleration) can be determined as an output variable of the control function of the forward-guiding driver assist system, but a desired clutch slip can additionally be determined when controlling the speed. The clutch actuator is then controlled commensurate with the clutch slip. With the invention, a clutch actuator may be incorporated in the driving strategies of the forward-guiding driver assist system. The forward-guiding driver assist system may then request, by way of this clutch actuator, a desired clutch slip and hence a controlled force transmission via the drive train. Advantageously, a clutch slip of 0-10% may be requested, wherein a clutch slip of 0% corresponds to an engaged clutch, and a clutch slip of 100% corresponds to a disengaged clutch.

The driver assist system thus has an additional degree of freedom to improve longitudinal control, because additional operating modes for realizing the actually desired requirements are now available in addition to the conventional operating mode—clutch engaged. More particularly, because states with a slipping clutch or with a disengaged clutch can now be established, the acceleration band, which could previously not be controlled at could be controlled only with great difficulties, becomes accessible. The driving comfort can thus be improved significantly; moreover, driving strategies optimizing fuel consumption, which operate for example in coasting mode, can now also be used. Overall, engine and brake can now be controlled less frequently during operation.

According to another advantageous feature of the present invention, the clutch slip can be determined based on at least one criterion directed to reducing the energy consumption of the motor vehicle and/or enhancing the comfort for the driver, in particular within the context of an optimization. The driver assist system may apply a control strategy optimizing fuel consumption and comfort by operating also with a partially disengaged or completely disengaged clutch depending on the actual demand for acceleration and the state of the drive train as well as the driving situation, which is represented by the driving-dynamics-related equation.

According to another advantageous feature of the present invention, when requesting a clutch slip, a target deceleration between a drag torque deceleration of the engine and a coasting mode deceleration during coasting with disengaged clutch may be produced without controlling an additional brake system of the motor vehicle. The clutch may then be partially disengaged with a request for a controlled force transmission via the drive train, thereby expanding the range of possible target decelerations. It then becomes unnecessary to use additional brake systems in addition to the engine brake.

According to another advantageous feature of the present invention, because control of the speed is now extended with the clutch slip, additional operating modes may be used, in addition to an operating mode where the clutch is fully engaged, which have the form of a coasting mode, where the clutch is fully disengaged, and/or operation with a fully disengaged clutch and a simultaneous brake intervention and/or operation with a partially disengaged clutch, in particular when the engine produces a drive torque. With the additional clutch actuator, more operating modes may thus be added and realized within the driving strategy of the driver assist system. For example, a freely coasting motor vehicle with a completely open drive train (coasting mode) may be realized. Additional brake intervention becomes possible when the motor vehicle has a completely open drive train. The motor vehicle may also be operated with a drive torque (for example automatically set by an idle-speed controller) and a controlled clutch state, meaning a clutch slip between 0 and 100%. In particular in the latter operating mode, the torque regions that could thus far not been adjusted and the transitions into the overrun cutoff and out of the overrun cutoff can then be better represented or more comfortably designed, due to a type of "damping" provided by the clutch slip. The comfort of torque converters can also be represented by combining a clutch actuator and a manual transmission.

With the method of the invention, the driving comfort is enhanced during operation of the driver assist system. The forward control can be better implemented because several operating modes are available. The energy consumption can also be reduced because, on one hand, improved driver assist system driving strategies for improved fuel consumption become possible and, on the other hand, the engine and the brake are less frequently controlled during operation.

According to another aspect of the invention, a motor vehicle includes a clutch, a clutch pedal as an actuator for manually operating the clutch, an additional clutch actuator constructed to disengage and engage the clutch, and a forward-guiding driver assist system having a controller configured to perform at least one driving intervention for controlling the speed of the motor vehicle selected from determining a desired clutch slip, when controlling the speed, and controlling the additional clutch actuator for automatically disengaging and engaging the clutch commensurate with the determined clutch slip. When using the clutch actuator that can be controlled directly and/or indirectly via the controller, a desired clutch slip can be determined and used for controlling the speed by controlling the clutch actuator so that the desired clutch slip is adjusted. All discussions relating to the advantages of the method of the invention also apply to the motor vehicle according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
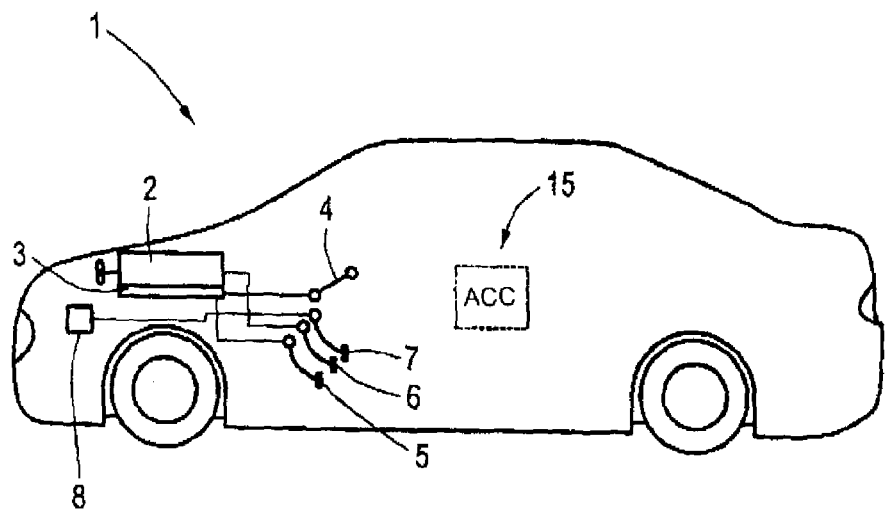
FIG. 1 a schematic diagram of a motor vehicle according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a motor vehicle 1 according to the invention, which includes an engine 2 and a transmission 3 that can be manually shifted by the driver via a gear shift lever 4, whereby the transmission must be uncoupled. This is accomplished, as generally known, with a clutch pedal 5 which must be actively moved by the driver for disengaging or engaging the clutch.

Also provided is a gas pedal 6 which controls the fuel supply and hence conveys a desired drive torque to the engine 2. Lastly, a brake pedal 7 is provided which controls the brakes of a brake system 8 in a conventional manner.

Figure 2:
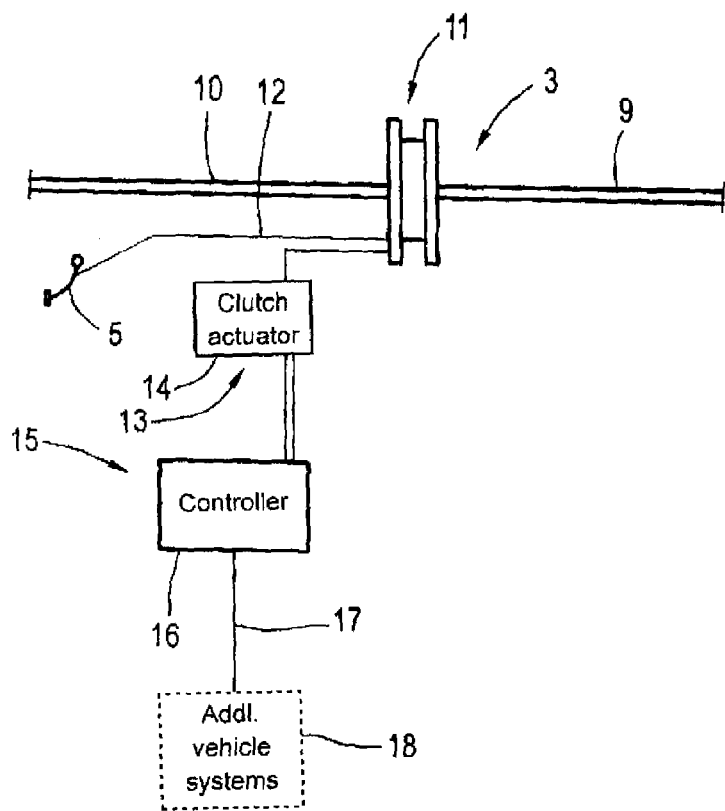
FIG. 2 a schematic diagram of transmission components important for the present invention.

FIG. 2 shows important components of the motor vehicle 1 in form of a schematic diagram. Illustrated is a transmission 3 with a gear input shaft 9 and a crankshaft 10, which can be reversibly coupled and uncoupled via a clutch 11. As already mentioned, this is accomplished with the clutch pedal 5 which is actively operated by the driver. When the clutch pedal 5 is depressed, the clutch is disengaged, wherein when the clutch pedal 5 is released, the clutch 11 is engaged. The clutch pedal 5 thus forms an actuator which in the present exemplary embodiment operates on the clutch 11 purely mechanically, in particular via a Bowden cable 12 shown in FIG. 2, which directly operates on the clutch.

In addition, an additional actuator 13, namely a clutch actuator 14, is provided which can be implemented as a servo motor and which is preferably arranged directly inside the transmission 3. The clutch actuator 14 can then also operate directly on the clutch—in parallel with the Bowden cable 12. However, other embodiments of the actuator may be contemplated.

The motor vehicle 1 further includes a forward-guiding driver assist system 15, in this example an ACC system (adaptive cruise control), schematically indicated in FIG. 1. The driver assist system 15 includes a controller 16 which can be used to also control the clutch actuator 14. The controller 16 is constructed to perform the method according to the invention, meaning to determine a desired clutch slip (clutch slip demand) in parallel with a desired acceleration demand (which as a negative acceleration demand also includes a deceleration demand). The clutch actuator is controlled based on the determined clutch slip for adjusting the desired clutch slip.

The driver assist system 15 is connected via a schematically indicated vehicle bus 17 to additional vehicle systems 18, from which various information can be obtained, in particular environmental data, or to which demands can be transmitted, for example the aforementioned acceleration demand, by which the brake system 8 and the engine 2 can be controlled as additional vehicle systems 18.

The basic functionality of a forward-guiding driver assist system, which controls the speed of a motor vehicle, is known in the art and will therefore not be described in detail.

Figure 3:
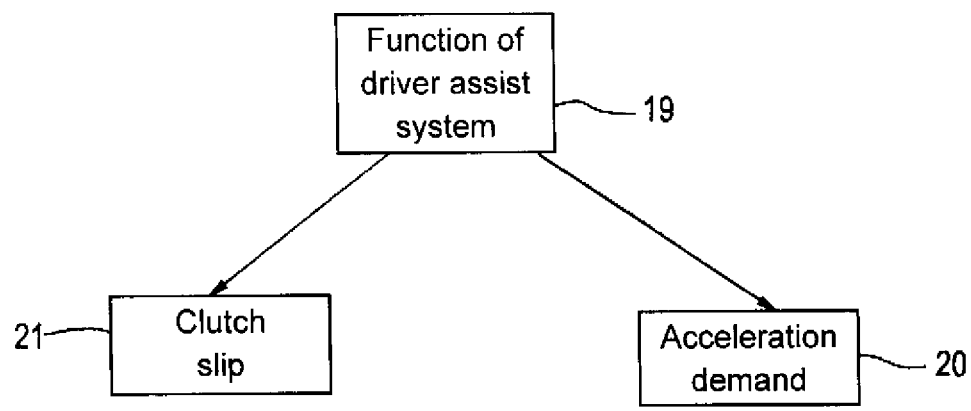
FIG. 3 a flow diagram describing the method according to the present invention.

As described above, the controller 16 is constructed to perform the method according to the invention, which is described schematically in the flow diagram of FIG. 3. Not only the acceleration demand 20 is now outputted (and optionally additional parameters known in the art) based on the function 19 of the driver assist system 15, actually the speed control, but in addition a clutch slip 21 is determined. The clutch slip 21 may be between 0 and 100%, wherein 0% corresponds to a fully disengaged clutch 11, whereas 100% corresponds to a fully engaged clutch 11. The function 19 recognizes these possibilities which are integrated in the employed driving strategy. In the present example, a criterion directed to reducing the energy consumption of the motor vehicle 1 and a criterion directed to enhancing the comfort for the driver are used, which are optionally suitably prioritized.

By using the additional degree of freedom of the clutch slip 21, additional operating modes are possible in addition to an operating mode where the clutch 11 is fully engaged. These additional operating modes can be used to satisfy the demand for comfort and lower the fuel consumption. The following operating modes are hereby available:

a) a coasting mode, wherein the clutch 11 is fully disengaged, b) operation with fully disengaged clutch 11 and simultaneous brake intervention via the brake system 8, and c) operation with a partially disengaged clutch 11, when the engine 2 provides a drive torque.

Advantageously, especially acceleration demands that could previously not be set, for example a target deceleration situated between a drag torque deceleration of the engine 2 and a coasting mode deceleration provided during coasting with disengaged clutch 11 can now be attained in the aforedescribed operating mode c). Transitions into or out of the overrun cutoff can be designed to be more comfortable due to the damping effect produced by the clutch slip 21. The operating modes a) and b) are particularly adapted to reduce the energy consumption, because the engine 2 and the brake system 8 need to be controlled less frequently.

Within the context of the present invention, the driving comfort can be enhanced and strategies optimizing fuel consumption can be applied even for a motor vehicle 1 having basically a manually operated clutch 11.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of operating a forward-guiding driver assist system in a motor vehicle having a clutch pedal as a driver-operated actuator for manually operating a clutch and an additional clutch actuator, comprising the steps of:
performing with a controller of the driver assist system at least one driving intervention for controlling a speed of the motor vehicle, wherein the at least one driving intervention comprises
determining a desired clutch slip commensurate with a target deceleration of the motor vehicle which is situated between a drag torque deceleration of the engine, with the clutch engaged, and a coasting mode deceleration provided in coasting mode with the clutch disengaged, in absence of control of an additional brake system of the motor vehicle;
controlling with the controller the additional clutch actuator for automatically partially disengaging or engaging the clutch commensurate with the determined desired clutch slip; and
controlling with the controller the speed of the motor vehicle based on the determined desired clutch slip and on the automatically partially disengaging or engaging of the clutch commensurate with the desired clutch slip.

2. The method of claim 1, wherein the forward-guiding driver assist system is an automatic cruise control system.

3. The method of claim 1, wherein the desired clutch slip is between 0% and 100%.

4. The method according to claim 1, wherein the desired clutch slip is determined based on at least one criterion selected from reducing energy consumption of the motor vehicle and enhancing comfort for a driver.

5. The method according to claim 1, wherein the desired clutch slip is determined so as to optimize energy consumption of the motor vehicle and enhance comfort for the driver.

6. The method of claim 1, wherein the additional clutch actuator is controlled commensurate with the determined desired clutch slip by at least one additional operating mode in addition to an operating mode where the clutch is engaged, said at least one additional operating mode selected from:
a coasting mode where the clutch is completely disengaged,
operation with a fully disengaged clutch and simultaneous brake intervention, and
operation with a partially disengaged clutch and the engine producing a drive torque.

7. A motor vehicle, comprising:
a clutch;
a clutch pedal as an actuator constructed to disengage and engage the clutch;
an additional clutch actuator constructed to disengage and engage the clutch; and
a forward-guiding assist system comprising a controller configured to perform at least one driving intervention for
controlling a speed of the motor vehicle selected from determining a desired clutch slip, when controlling the speed,
controlling the additional clutch actuator for automatically partially disengaging and engaging the clutch commensurate with the determined desired clutch slip, and
controlling the speed of the motor vehicle based on the determined desired clutch slip and on the automatically partially disengaging or engaging the clutch commensurate with the desired clutch slip;
wherein the desired clutch slip is determined by generating a target deceleration which is situated between a drag torque deceleration of the engine and a coasting mode deceleration provided in coasting mode with the clutch disengaged, in absence of control of an additional brake system of the motor vehicle.

* * * * *